Patented Dec. 9, 1941

2,265,770

UNITED STATES PATENT OFFICE 2,265,770

COMPOSITION OF MATTER

Richard A. Crawford, Akron, Ohio, assignor to The B. F. Goodrich Company, New York, N. Y., a corporation of New York No Drawing. Application March 6, 1937, Serial No. 129,519

2 Claims. (Cl. 260—722)

This invention relates to a new composition of matter, and has among its objects to provide a coating material which will be an efficient sound deadener on automobile bodies; to provide a coating material which will adhere firmly to a surface without chipping or cracking even after the prolonged shocks to which automobile bodies are necessarily subjected; and to provide a material which may be baked onto the inside of automobile bodies simultaneously with the baking operation used for automobile finishes.

For the quiet operation of automobiles, trains, and other vehicles, it is desirable to have some kind of sound-deadening material attached to the metallic bodies. While this has long been realized, compositions which were effective were too expensive to be widely used commercially. Asphalt compositions have a tendency to harden with cold, and to be so brittle that they crack and chip off from the surfaces to which they are attached. Sponge rubber is an excellent material, but is precluded because of its expense.

I have discovered that if certain compositions containing rubber, pitch, and a filler are mixed with a solvent and applied to metal or other surfaces by spraying, brushing, troweling, dipping, or extrusion, blowing or sponging occurs when the composite structure is subjected to a force drying or baking operation such as is used for baking the finish on automobiles.

The pitch is the principal component of my composition. Besides having excellent sound-deadening properties, it is cheap and serves as a cohesive for the composition. I prefer to use about 50% of pitch, though I may use as little as 30% and as much as 70% or over. A wide variety of pitches may be used, such as mineral rubber, pine pitch, asphalt, Burgundy pitch, coal-tar pitch, etc. The composition should be solid enough at the temperatures at which the sound-deadening composition is to be used, which is usually below 120° F. for automobile bodies, to retain the cellular structure which it assumes when it is blown. It must be soft enough at the temperature of baking, which is about 180°–250° F. so that it will blow to form the cellular structure, but must not be so soft that the composition collapses. Thus, the particular pitch which I select depends upon the characteristics which the composition must have at certain temperatures. I find that compositions containing Trinidad asphalt are suitable for use in automobile bodies.

I prefer to use from 10% to 30% of rubber in my new composition. Its presence modifies the thermoplastic characteristics of the pitch in such a manner that the composition is flexible over a wider temperature range than is possible with pitch alone. Such compositions are dough-like rather than fluid at baking temperatures, thus facilitating the formation of the cellular structure produced by evaporation of the solvent or blowing agents at baking temperatures. The term "rubber" is meant to include reclaimed rubber since it serves the same purpose and is much cheaper than crude rubber. One of the most satisfactory sources of rubber is tire reclaim made by the heater process.

Softeners such as pine tar, paraffin, and rosin may be added to further modify the characteristics of the composition. Rosin is especially useful to modify hardness of the dried material and to increase its adhesion to metal. I prefer to use 5% to 10% of rosin to produce these desirable results. Softeners, however, are not essential to the usefulness of my compositions.

A filler is used in the composition to strengthen it and to give it body. Though inorganic fillers such as clay, zinc oxide, chalk, diatomaceous earth, slate flour, and powdered mica may be used, animal, vegetable and mineral fibers such as wool, cotton flock, wood flour, asbestos, and spun glass are preferable because they are light and bulky. When from 30% to 60% of wood flour, which is an excellent filler, is incorporated into the mixture, it has a tendency to absorb the asphalt making less of it available for cementing and binding purposes. Moistening the wood flour before it is added to the mixture keeps the asphalt in the interstices of the composition and assists in making a spongy composition rather than a hard, solid mass.

It is an essential part of the invention that the cement be a "blowing cement" by which term I mean a cement which, when baked at the proper temperature, will become spongy and will retain its expanded condition after the baking is finished. The solvent which functions as the principal blowing agent is usually chosen from a group of narrow cut volatile hydrocarbon solvents such as benzene, naphtha, petroleum ether, gasoline, and the commercial heptane fraction known as Skellysolve C, the particular solvent chosen being one having a boiling point at about the temperature of baking or slightly below it. I may also use a solid blowing agent such as ammonium carbonate, but as these are effective only at temperatures higher than those usually used in baking the paint on automobile bodies, I usually prefer to employ only a solvent to perform the blowing operation.

The regulation of the viscosity and density of the solution largely determines the properties of the finished material. The problem is to form a coating which will become spongy at the desired temperature, and which will harden at the same time. If the composition hardens before it blows or is so soft that it collapses after it becomes spongy, the efficacy of the material as a sound-deadener will be seriously impaired. If the viscosity of the mixtures is lowered by the addition of solvent alone, they will often have too large a proportion of solvent in them for the best results. I usually prefer to regulate the viscosity with materials which are not solvents for rubber but which will break rubber cement gels such as alcohol, acetone, or organic acids and bases having this property such as acetic acid, chloracetic acid, piperidine, dimethyl amine, diethyl amine, etc. A small amount of one of these materials will vary the viscosity over a wide range. Thus, the blowing properties can be varied without adding a large amount of solvent, and a composition which is of the right consistency for troweling can be changed into a composition which can be sprayed by the addition of a small amount of gel-breaking compound.

As a specific embodiment of my invention, I will disclose the material which I use as sound-deadener on automobile bodies. I prepare the following composition:

| | Parts by weight |
|---|---|
| Trinidad asphalt | 50 |
| Reclaimed rubber | 12 |
| Wood flour | 30 |
| Rosin | 8 |
| Hightest gasoline | 50 |

I combine these materials in a mixer, moistening the wood flour with water before it is added. This composition is troweled upon a metallic surface and baked for one hour at 200° F. The resulting material is a spongy sound-deadening coating firmly adhered to the metal. When the inside of automobile bodies are to be covered, it is often convenient to apply the material with a spray gun. A little alcohol is added to the composition to break the gel, and it is sprayed onto the inside of the body as the paint is sprayed onto the outside. The body is then baked for an hour at from 180°–240° F. and the resulting body has a very efficient sound-deadening coating firmly adhered to the inside.

Though this new composition of matter is primarily useful as a sound deadener, it may also be used as sponge gaskets, sealing members, flooring, etc. While I have disclosed a particular composition, I do not limit myself wholly thereto, for it is evident that many modifications including substituting equivalent materials and varying the proportions of materials used are within the spirit and scope of the invention as defined in the appended claims.

I claim:

1. A spongy, sound-deadening material consisting of substantially 12% of reclaimed rubber, 50% of asphalt, 30% of wood flour, and 8% of rosin.

2. The method which comprises baking a fluid composition comprising principally pitch disseminated in a volatile liquid together with at least sufficient amounts of rubber and a filler to form compositions which will not collapse at baking temperatures after blowing, whereby said liquid is gasified and removed from said layer to form a spongy, sound-deadening material.

RICHARD A. CRAWFORD.